(12) United States Patent
Kozat et al.

(10) Patent No.: US 10,367,728 B2
(45) Date of Patent: Jul. 30, 2019

(54) METHODS FOR FORWARDING RULE HOPPING BASED SECURE COMMUNICATIONS

(71) Applicant: ARGELA-USA, INC., Sunnyvale, CA (US)

(72) Inventors: Ulas Can Kozat, Mountain View, CA (US); Mehmet Oguz Sunay, San Francisco, CA (US)

(73) Assignee: NETSIA, INC., Sunnyvale, CA (US)

( * ) Notice: Subject to any disclaimer, the term of this patent is extended or adjusted under 35 U.S.C. 154(b) by 85 days.

(21) Appl. No.: 15/211,885

(22) Filed: Jul. 15, 2016

(65) Prior Publication Data

US 2017/0019329 A1    Jan. 19, 2017

Related U.S. Application Data

(60) Provisional application No. 62/192,951, filed on Jul. 15, 2015.

(51) Int. Cl.
*H04L 12/723* (2013.01)
*H04L 12/771* (2013.01)

(52) U.S. Cl.
CPC ............ *H04L 45/50* (2013.01); *H04L 45/563* (2013.01)

(58) Field of Classification Search
None
See application file for complete search history.

(56) References Cited

U.S. PATENT DOCUMENTS

| | | | |
|---|---|---|---|
| 2015/0023147 A1* | 1/2015 | Lee | H04L 45/38 370/216 |
| 2015/0043589 A1* | 2/2015 | Han | H04L 45/38 370/392 |
| 2015/0295885 A1* | 10/2015 | Congdon | H04L 61/2557 370/392 |
| 2015/0319089 A1* | 11/2015 | Liu | H04L 45/745 370/392 |
| 2016/0197831 A1* | 7/2016 | De Foy | H04L 45/7453 370/392 |
| 2016/0301601 A1* | 10/2016 | Anand | H04L 47/12 |
| 2017/0331838 A1* | 11/2017 | Schneider | H04L 63/126 |

\* cited by examiner

*Primary Examiner* — Saba Tsegaye
(74) *Attorney, Agent, or Firm* — IP Authority, LLC; Ramraj Soundararajan

(57) ABSTRACT

One or both end points of the communication and a network controller of a software defined network (SDN) agree on a definition of a traffic flow that varies as a function of time, where communicating end points vary one or more fields of the packet headers at the sender side before sending the flow packets to the network according to an agreed upon procedure with the network controller. The network controller dynamically updates the forwarding tables in forwarding elements such that whenever source node transitions into the next epoch, and thus alter the header fields, a corresponding forwarding rule is already installed onto the forwarding elements along the route of the packet towards the other end point of the communication, referred to as destination node.

22 Claims, 7 Drawing Sheets

FIG. 7

| TIME SLOT | RULE NUMBERS | | | | | | | |
|---|---|---|---|---|---|---|---|---|
| | 1 | 2 | 3 | 4 | ... | n-3 | n-2 | n-1 | n |
| t1 | S1 | S2 | S3 | S8 | | S20 | S11 | S4 | S6 |
| t2 | S3 | S4 | S8 | S11 | | S1 | S6 | S20 | S2 |
| t3 | S11 | S20 | S4 | S3 | | S2 | S1 | S6 | S8 |
| t4 | S20 | S6 | S2 | S11 | | S8 | S3 | S1 | S4 |
| ... | | | | | | | | | |

# METHODS FOR FORWARDING RULE HOPPING BASED SECURE COMMUNICATIONS

RELATED APPLICATION

This application claims benefit of U.S. provisional application Ser. No. 62/192,951 filed Jul. 15, 2015.

BACKGROUND OF THE INVENTION

Field of Invention

The present invention pertains to routing of flows in software-defined computer and communication networks, and more particularly to system and methods for enabling secure communications between source and destination nodes in such networks via programmatically controlled dynamic routing rule updates.

Discussion of Related Art

The invention presented herein is concerned with a method to enable communications between source and destination nodes via dynamic forwarding rule updates for fast authorization, authentication, and accounting (AAA) support for network flows, while preventing unauthorized users accessing the network.

A related technology exists for wireless networks as frequency hopping spread spectrum systems where the goal is to protect communication against jamming attacks. In such systems, the carrier frequency of the channel used between the transmitter and receiver is switched regularly in short intervals using a pseudorandom sequence known only to the transmitter and the receiver. The total available bandwidth is divided into small sub-bands in frequency hopping spread spectrum systems and according to the pseudorandom code, and the communications are conducted over only one of these sub-bands at a given time.

In the computer networks domain, a programmatic admission control mechanism in the literature is DIFANE (and OpenFlow as its successor). DIFANE/OpenFlow provides a per flow granularity for performing policy based admission control. When a packet of a traffic flow is seen for the first time at a forwarding element with no forwarding rule set up, the packet or the header of the packet is sent to the controller of the Software Defined Network (SDN). The controller inspects the information in the packet headers (and/or in the payload if the whole packet is sent) to determine which set of policies must be applied to this traffic flow (e.g., is the source MAC address registered as an authorized user?, is the user of this device allowed to access the services in the destination IP address or port?, is the communication protocol allowed in the network?, etc.). Based on this inspection, the controller installs a flow table rule on the said forwarding element that instructs how to handle the existing and subsequent packets of that flow (e.g., drop the packets, forward them to a particular logical or physical port, rewrite one or more header fields, etc.).

In LAN or WLAN systems, end users' devices are registered (e.g., user name, device, MAC address, host name, etc.) by the system admin once IP addresses are assigned. When such registered devices attach to the network, they are authenticated through a server such as RADIUS or DIAMETER if no local context is present at the access point and once it is done, users can access the network.

In cellular systems, user equipment (UE) is authenticated during the attachment procedure by the network (e.g., when the devices are first powered on). UE has access to its mobility management entity (MME) that authenticates the user in the attachment process and establishes default bearers in the core network for the UE. The UE can be in idle or active state. During the idle state, base stations lose the context about the UE (i.e., radio bearers and S1 user plane bearers are discarded). When UE wants to communicate, it switches from idle to active state by establishing the context at the base station it attaches to via its MME. After the radio bearers and S1-u are established, communications proceed. In many use cases for machine to machine or Internet of Things (IoT) applications, machines send short packets relatively infrequently only when certain triggers occur. When such triggers occur, the generated data must be sent very fast. Such communication patterns would lead to UE remain mostly in the idle state and when trigger happens UE needs to switch immediately to active state. This however incurs high delays due to the bearer establishment procedure. One simple alternative is to keep the device always be in an active mode by sending periodic keep-alive type messages from UE. The negative side effect is that UE, which is often a battery powered small device in M2M or IoT applications, would drain its battery faster.

Embodiments of the present invention are an improvement over prior art systems and methods.

SUMMARY OF THE INVENTION

In one embodiment, the present invention discloses a method as implemented in a sender of a software defined network (SDN) comprising: (a) communicating with a to controller in the SDN and agreeing on a parametric function for altering one or more header fields in a header of a packet flow over time, wherein the controller also communicates the agreed upon parametric function with a receiver of the packet flow; and (b) sending the packet flow along a route in the SDN by altering one or more fields in the header of the packet flow based on the agreed upon parametric function.

In another embodiment, the present invention discloses a method as implemented in a controller of a software defined network (SDN) comprising: (a) communicating with a sender and a receiver in the SDN and agreeing on a communications procedure for altering one or more header fields in a header of a packet flow over time, the sender sending the packet flow by altering one or more fields in the header of the packet flow based on the agreed upon communications procedure; and (b) sending forwarding rules or flow tables to one or more forwarders in the SDN such that when the sender transitions into communications involving the agreed upon communications procedure based on altered header fields, a corresponding altered forwarding rule matching new header fields with an associated action is installed in all forwarders along a route of the packet flow.

In yet another embodiment, the present invention provides a method as implemented in a sender of a software defined network (SDN) comprising: (a) communicating with a controller in the SDN and agreeing on a communications procedure for altering one or more header fields in a header of a packet flow over time, wherein the controller also communicates the agreed upon procedure with a receiver of the packet flow; (b) sending the packet flow by altering one or more fields in the header of the packet flow based on the agreed upon communications procedure; and wherein the controller sends forwarding rules or flow tables to one or more forwarders in the SDN such that when the sender transitions into communications involving the agreed upon communications procedure based on altered header fields, a corresponding altered forwarding rule matching new header fields with an associated action is installed in all forwarders along a route of the packet flow.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 7 shows a circular reuse of packet header fields.

DESCRIPTION OF THE PREFERRED EMBODIMENTS

Figure 1:
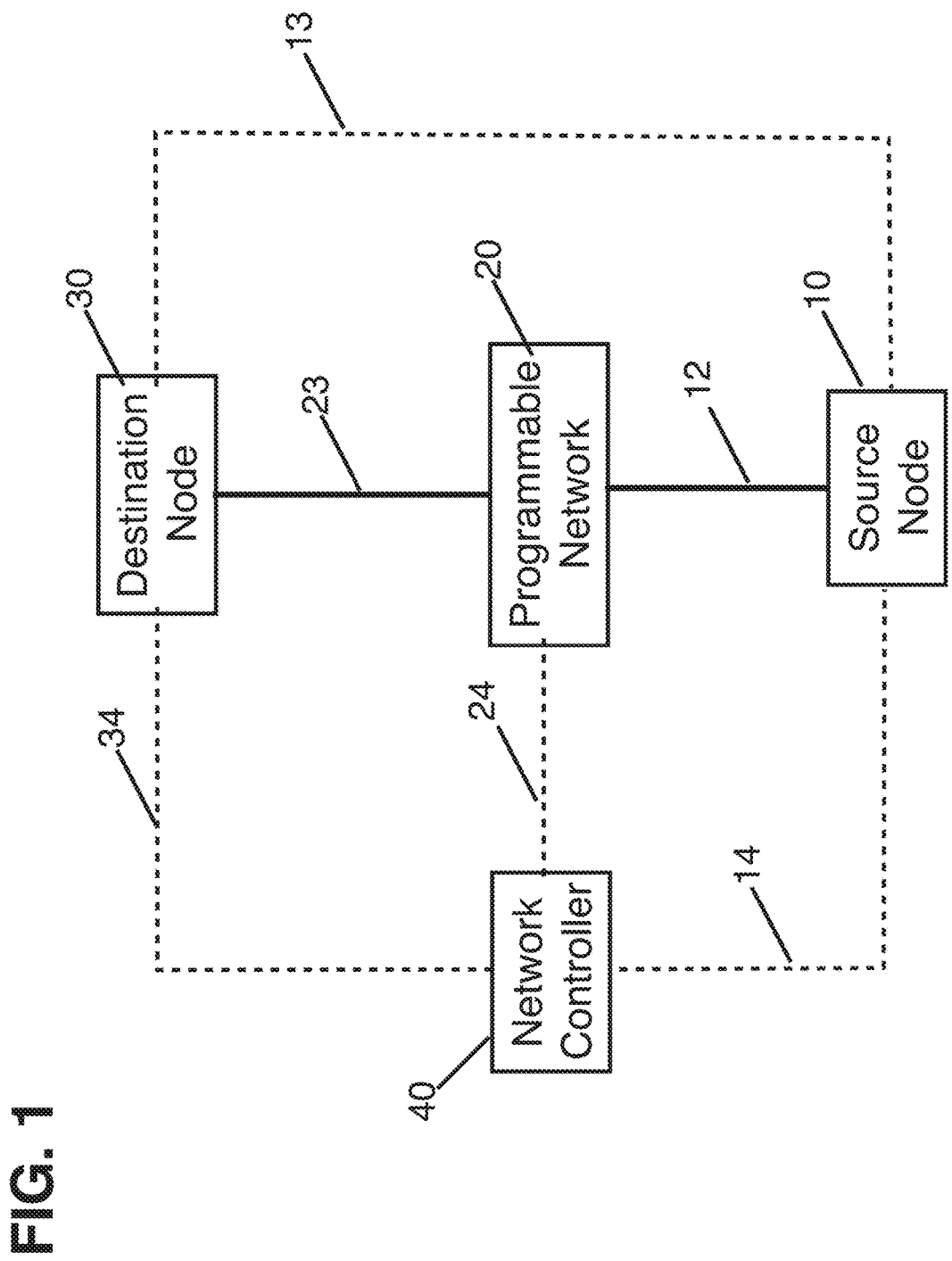
FIG. 1 shows an SDN scenario according to invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

In order to bypass control signaling and enable fast routing of short flows (e.g. 1 packet), it is necessary to offload the Authorization, Authentication, and Accounting (AAA) functionality to the user/date plane using appropriately constructed forwarding rules. However, assigning static forwarding rules for authorized users or services to enable fast network access can potentially have poor security consequences. Unauthorized devices or applications can fill in the packet headers to match against an existing forwarding rule in the network. One remedy for this is to put a hard time limit for the flow rule and re-authorize the flow after the timeout. For a periodic, event-triggered communication patterns between two communication end points, specifying a short timeout period would lead to authorizing each packet delivered between these communication end points. This would increase the communication latency by multiple orders of magnitude (e.g., 100-1000×). Specifying longer timeout periods would increase the window of opportunity for unauthorized users to access the network and services.

The disclosed invention provides a coordinated solution with one or both end points of the communication and a network controller such that these entities agree on a definition of a traffic flow that varies as a function of time. End points of the communication vary one or more fields of the packet headers at the sender side (also referred to as source node) before sending the flow packets to the network according to the agreed upon procedure with the network controller. The network controller dynamically updates the forwarding tables in forwarding elements such that whenever source node transitions into the next epoch, and thus alter the header fields, a corresponding forwarding rule is already installed onto the forwarding elements along the route of the packet towards the other end point of the communication, referred to as destination node. The pattern that is varied within the header fields over time is a shared secret between the network controller and communication end points. This shared secret must be negotiated and committed first by these three entities before the source node and network controller start executing their respective procedures. Since adversaries do not know the secret pattern, they have to guess it correctly to have their packets routed through the network.

FIG. 1 shows the main entities of the disclosed invention in a typical usage scenario. A traffic flow is established between at least two entities: source node (10 in FIG. 1) and destination node (30 in FIG. 1). Packets of the traffic flow are sent from source node into the network, through which they are routed towards and reach at the destination node. The network in FIG. 1 (20) is a programmable network that is controlled/programmed by a logically centralized network controller (40) through a standard or propriety control interface (24 in FIG. 1). Network controller installs forwarding rules in the flow tables of the forwarding elements that form together the programmable network. Source node attaches to the programmable network through a direct link or a routed/switched path (12 in FIG. 1). Destination node also attaches to the programmable network through a direct link or a routed/switched path (23 in FIG. 1). Source and destination nodes have a logical interface in between (13 in FIG. 1) that defines the messages and their byte level formats for the mutual communication. Network controller has also logical interfaces (14 & 34 in FIG. 1) with source (10) and destination (30) nodes, respectively. These interfaces are used for building a consensus on the definition of flow templates and how they vary over time. Packets generated by the source node (10) must format the headers of the payloads defined by the interface (13) in accordance with the agreed upon flow templates that vary over time.

Figure 2:
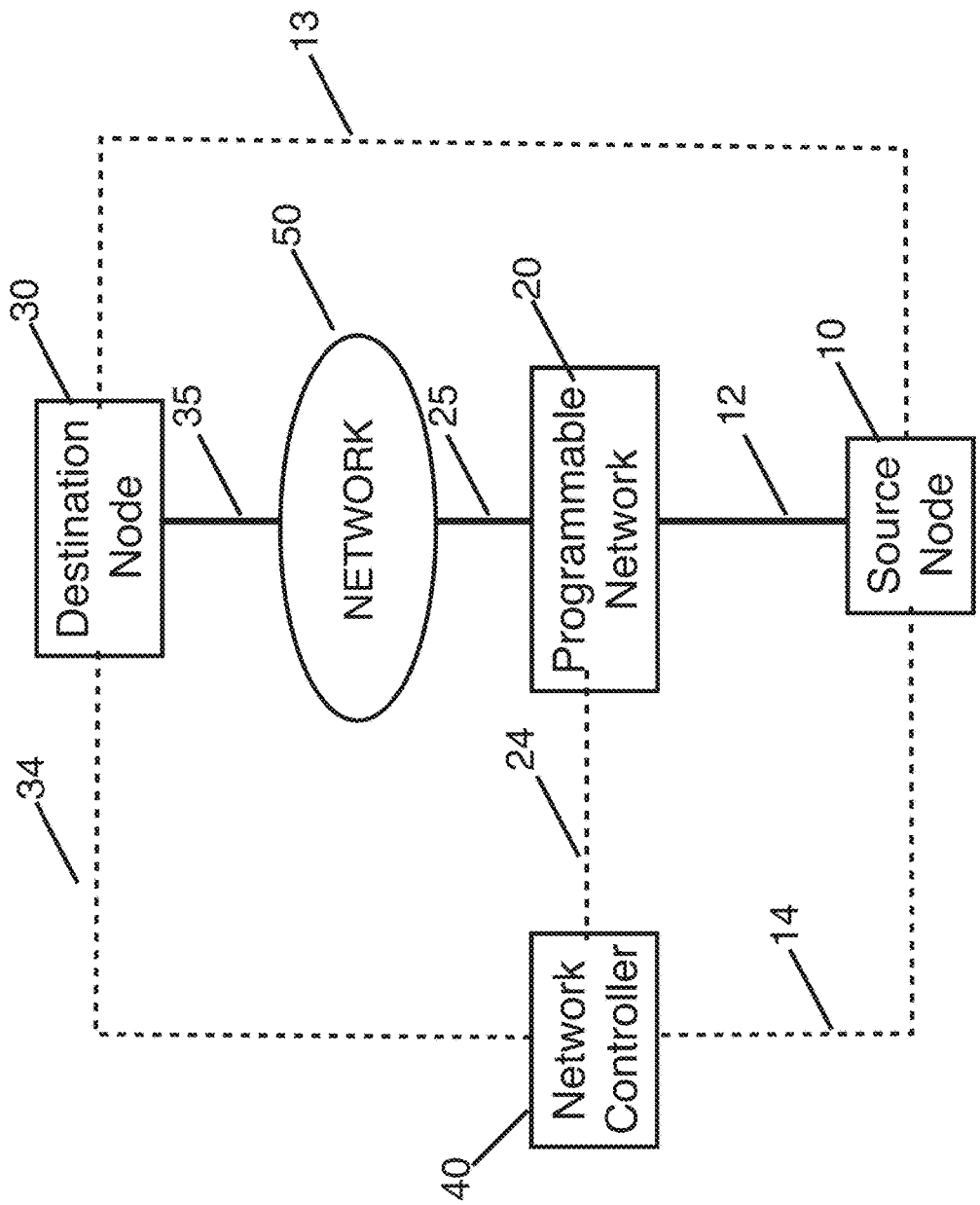
FIG. 2 shows an SDN and non-SDN scenario according to invention.

FIG. 2 supports the same entities and interfaces as in FIG. 1, but additionally it introduces a non-programmable network that cannot be programmed or controlled by the network controller. Such non-programmable network can be programmable or configurable by other entities that are not part of this invention. The whole purpose of this depiction is that the network route between the source and destination node can be partially visible and controllable by the network controller and invention is applicable to such scenarios as well.

Figure 3:
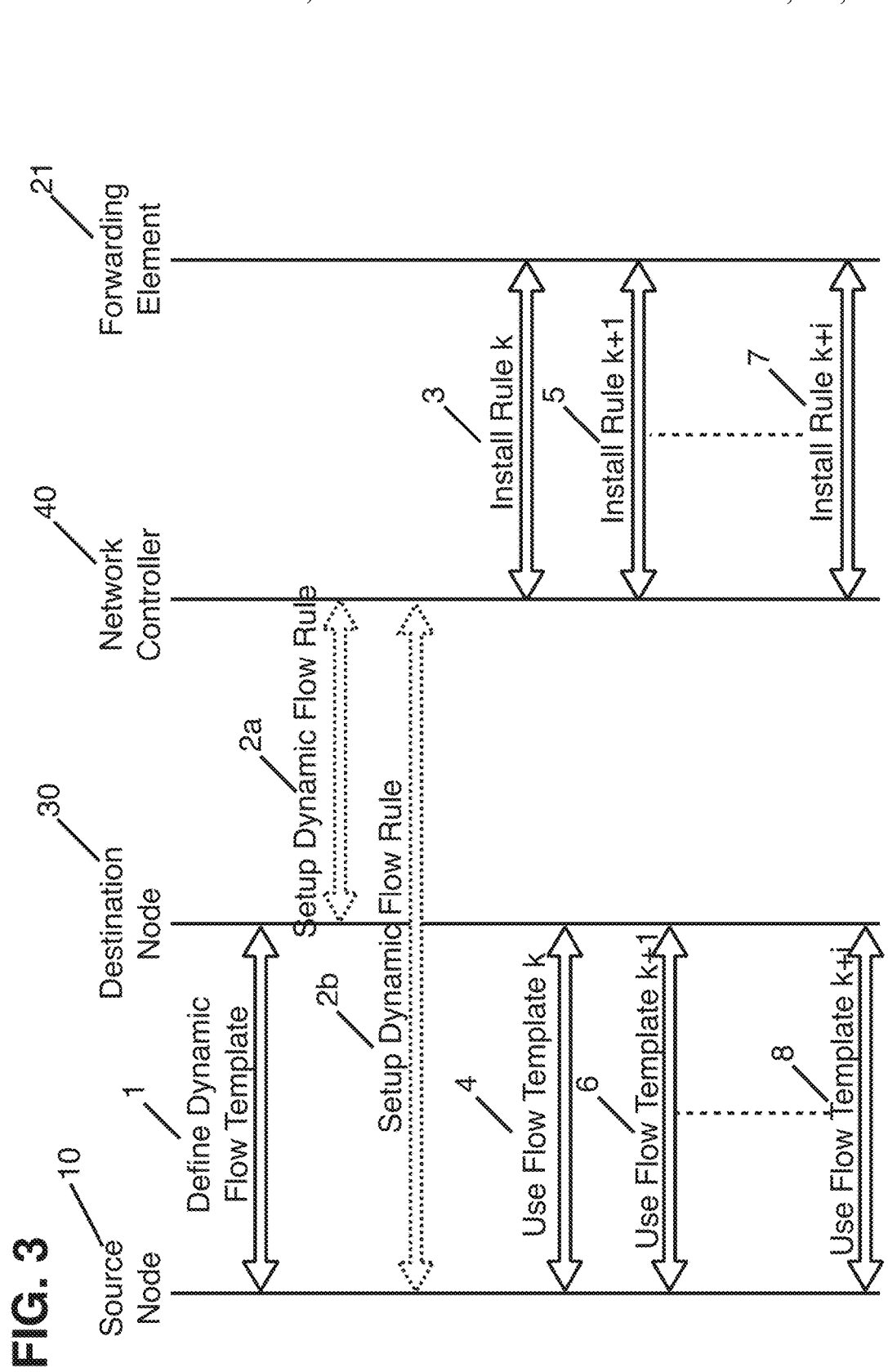
FIG. 3 shows an exemplary sequence of communications between different entities to realize the invention.

FIG. 3 shows an example of the sequence of communication between different entities to realize the invention. Source node (10) and destination node (30) first communicate with each other over the interface (13) in FIG. 1 to define a dynamic flow template according to which a well-defined subset of flow headers are set to well-defined values as a function of time. This communication is labeled as (1) in FIG. 3. After the dynamic flow template is configured among the source-destination pairs, either the source node or the destination node communicates with the network controller (40) to set up the dynamic flow rule (arrows (2a) and (2b) in FIG. 3, respectively) using the corresponding interfaces ((14) or (34) in FIG. 1, respectively). The network controller periodically installs new forwarding rules according to the dynamic flow rule set up onto the corresponding forwarding elements (e.g., (21) in FIG. 3) using the interface (24) in FIG. 1. The sequence of these flow installations are labeled as (3), (5), (7) in FIG. 3. In parallel, the source node also alters the flow headers according to the dynamic flow template for the communication between the source-destination pair that match the flow rules installed on the forwarding elements. For example, in FIG. 3, flow template (4) matches rule (3), flow template (6) matches rule (5), flow template (8) matches rule (7), etc.

Figure 4:
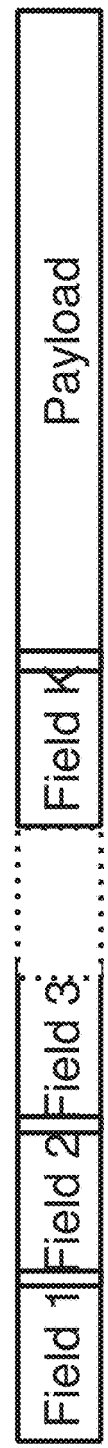
FIG. 4 depicts a packet header with K header fields.

FIG. 4 shows a packet of a network flow as an ordered sequence of bytes that define a bounded number of packet header fields (K such fields are depicted in FIG. 4 as an example) followed by a packet payload that is interpreted by the communication end points.

Figure 5:
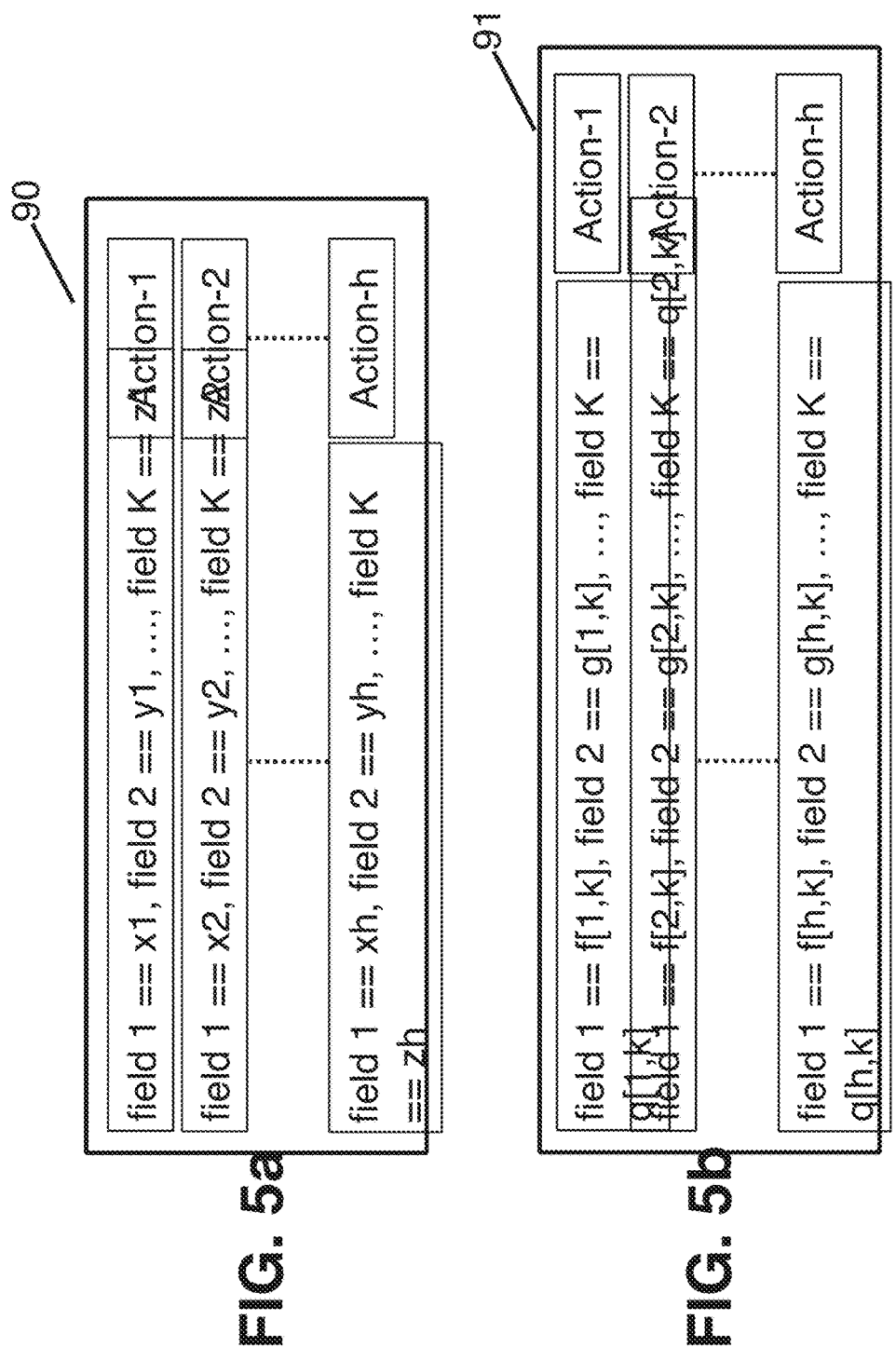
FIG. 5 illustrates two flow table examples according to the invention.

FIG. 5 shows two flow table examples, where one is static (90) and the other dynamic (91). The flow tables in both cases list all active rules that a forwarding element needs to follow. Each entry in the flow table is composed of a mask of the header fields, referred to as the flow definition, and the corresponding action that the forwarding element needs to execute for each packet that satisfies this definition. When the table has static entries as in (90), then throughout the duration of a communication session between a source and a destination node, the flow definitions for the corresponding entries remain the same. When the table has dynamic entries as in (91), the flow definitions are not fixed, but change periodically within the duration of the communication session between the sender and the receiver. It is also possible to have a hybrid table where some entries are dynamic and others static. Different flow rules can be matched on different subset of header fields and FIG. 5 is just an example, where each table entry defines a matching rule using all of the header fields. This may not always be necessary. The unused fields can be simply labeled as "don't care" fields, and flows can assume arbitrary values in the "don't care" fields and they will be matched to the same action as long as other fields are matched exactly. Some fields can be given a bit-mask and only be matched on the bits that are equal to one to enable partial matching on desired header fields. In (90), xi, yi, zi, etc. are fixed values for the i-th rule. In 91, f[i,k], g[i,k], q[i,k], etc. are the fixed header field values computed and installed for the i-th rule during the k-th epoch by the network controller or its local agent on the forwarding element. These functions for each flow are negotiated and agreed upon between communication end points and the network controller. Although the matched field values are dynamically varied over time, the corresponding action typically remains the same.

Figure 6:
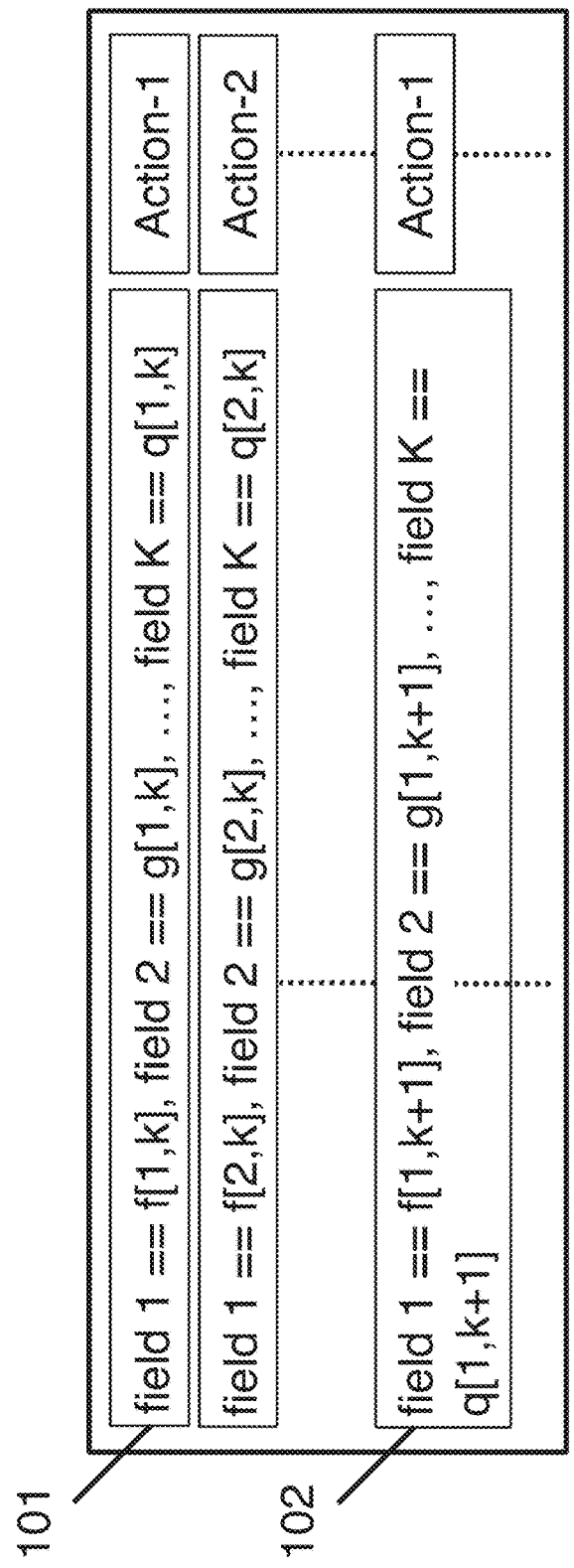
FIG. 6 shows an old and new rule coexisting according to an aspect of the invention.

FIG. 6 shows a flow table where two rows (101 & 102) of the flow table are for the same session between the same source and destination nodes, but the flow definitions are altered between k-th and (k+1)-st epochs. In transitional periods, the invention allows for both the old and new rules to co-exist until the old rule time-outs. The network controller must ensure that the old or new rule does not interfere with another rule installed on the flow table.

FIG. 7 shows how the same set of header field values can be circulated across different communication sessions to reuse all the allowed field values to prevent fragmentation and starvation of flow templates that are assigned to active sessions.

The invention requires four entities at minimum: A network controller (40 in FIG. 1), a programmable network (20 in FIG. 1), a source node (10 in FIG. 1), and a destination node (30 in FIG. 1). The programmable network is comprised of one or more programmable forwarding elements such as switches, routers, gateways, etc. Source and destination nodes can be peer devices (e.g., user equipment). One of the source node or destination node can be the client and the other can be the server. Both or one of the source and destination nodes can be wireless or wired. In a typical embodiment, source node is a server in a data center and destination is a mobile device. Source node, programmable network, and server in FIG. 1 define together the user/forwarding/data plane that carries the packets of traffic flows from the source node to the destination node. A physical or virtual device can be a source node, a destination node, or both in different communication sessions. The network controller along with the control agents running on the forwarding elements, the source node, and the destination node form the control plane that negotiates, monitors, and controls network policies and the behavior of forwarding plane nodes. Interfaces (14), (24), and (34) in FIG. 1 are control interfaces. Source node (10) uses interface (14) and destination node (30) uses interface (34) in FIG. 1 to request network services such as network access. Network controller (40) utilizes interface (24) in FIG. 1 to set up forwarding and monitoring rules onto the forwarding elements of the programmable network. Interface (13) in FIG. 1 defines the communication messages passed between the source node and the destination node.

In another embodiment, the network interconnecting the source and destination nodes can be a mixture of forwarding elements that are programmable by a logically centralized network controller and forwarding elements that are not programmable by the same logically centralized network controller. FIG. 2 depicts an example of this scenario where a non-programmable network (50) interconnects programmable network and destination node using interfaces (25 & 35). In one embodiment, the programmable network can be an access network built using OpenFlow switches and the non-programmable network can be a traditional IP-based network. The figure is just an example, and the forwarding elements of the programmable network can also be, for instance, overlaid on top of a non-programmable network, or vice versa.

The core idea of the invention is to program the forwarding elements with dynamic forwarding rules to protect the network against unauthorized access while providing fast routing for the communication pairs. In a typical embodiment, the communication pairs (e.g., source and destination nodes of a data traffic) agree on a dynamic flow template (e.g., control traffic 1 in FIG. 3, which is carried over interface 13 in FIG. 1). The flow template defines which header fields are to be used for dynamic flow rules. In one embodiment, the transport protocol's (e.g., TCP or UDP) source port number, destination port number, or both may be used for this purpose. In another embodiment, the VLAN or VXLAN tags may be used. In another embodiment, the source or destination IP address may be used. Yet, in another embodiment, a propriety protocol header may be defined and used as long as the programmable network supports such custom protocol extensions.

In some cases, such as when source or destination port numbers are used as dynamic header fields, the network is not involved in the assignment process for these header fields. Thus, the source and destination nodes can mutually decide on the sequence of port numbers to be used and pass this information during the dynamic flow rule set up procedure with the network controller (2a or 2b in FIG. 3). One way of specifying this sequence is to define a function using a set of basic function libraries in a language supported by the network controller and to pass the function definition to the network controller. The network controller using an interpreter or a compiled module uses this function to generate the next flow rule to be installed for the communication between the source and the destination nodes. If some of the rules are not allowed by the network (e.g., due to a firewall policy), such cases must be communicated between the network controller and the source and destination nodes (using interfaces 14 and 34 in FIG. 1) to create rule exceptions (e.g., skip certain port values).

Alternatively, the network may assign the header fields used in the definition of a flow template (e.g., source or destination IP addresses). In one embodiment, it is the network controller that assigns a sequence of field values during the dynamic rule set up procedure. Thus, the network controller informs the source and destination nodes about the dynamic flow rules it will be installing as a sequence of time onto the forwarding elements. Similar to the previous embodiment, the sequence may be created using a to function and in this case, it is this function that the network controller may choose to share with the nodes.

Once the source node, destination node, and the network controller mutually agree on the sequence of flow rules to be used for matching and subsequently forwarding the flow between the source node and destination node, the network controller periodically installs the forwarding rules onto the forwarding elements (shown as (3), (5), and (7) in FIG. 3). For its packets to be forwarded correctly, the source node modifies the header fields of each packet according to the sequence of flow templates corresponding to the same sequence of flow rules installed on the forwarding elements (shown as (4), (6), and (8) in FIG. 3).

A packet is composed of many header fields and a payload consumed by the application as illustrated in FIG. 4. The invention is applicable to any network supporting forwarding rules based on flow tables that define matching rules based on one or more fields within the packet headers. The forwarding elements can support single or multiple tables where matched flows can be forwarded to other tables or physical/virtual ports of the switch for further processing or forwarding. Flow table entries can be masked to partially match each header field or can support metadata based on the matching events in previous tables. Metadata values can be also used to match flows. FIG. 4 shows an instance of a packet, where field ranges can themselves be defined/programmed by the network.

The invention described herein covers the case where flow tables are a collection of static values that are installed and removed by the local controller agent on the forwarding element based on the timeout requirements or flow remove/install commands received from the network controller. The network controller itself sends a new forwarding rule periodically according to the sequence of forwarding rules agreed upon with the source and destination nodes as in (3), (5), (7) in FIG. 3. An example of a static forwarding table is given in FIG. 5a, where h flow rules are installed with specific values to be matched for different fields and the corresponding action. Some of these field values can be "don't care", i.e., they are not matched at all.

The invention also covers the case where the function used to change the flow rule installed on the forwarding element actually is executed locally on the forwarding element. In such a case, the network controller needs to inform the forwarding element of the function as well as the rule update condition. This condition may be time-driven or event-driven. For instance, in FIG. 5b, for the first field (field 1) of the i-th flow rule, the function f[i,k] is used. Here, k is the time index or sequence number of the flow rule. Then, if f[i,k] is the current flow rule, then the next flow rule to be installed locally is given by f[i,k+1]. Similarly, for the second field (field 2), another function is defined for each entry (i.e., g[i,k]). The invention covers scenarios where the generation of the rule updates is executed either locally at each involved forwarding element, or at the network controller. If the execution is at the network controller, then the controller will need to send the updates rules to the forwarding elements. The rules may have expiration conditions embedded in them. Alternatively, the network controller may send explicit delete rules of the current table entry along with the updates. If the function execution takes place at the forwarding elements, the rule updates may take place at regular time intervals or via event triggers such as the handling of one or more packets using the current table entry. In such a case, the details of the update condition need to be a priori informed by the network controller. Alternatively, the forwarding element may generate the rule update upon receiving an "update rule" message from the network controller.

Note that the function for a given field can be defined as "don't care" for all or some of the installed forwarding rules. A typical implementation would implement the dynamic table as a sequence of static tables, where at each new epoch for a dynamic flow, a new forwarding rule is installed and the existing one is deleted. Note that not all flows are required to be dynamic flows, different dynamic flows can have different flow update periods, and dynamic flows are installed asynchronously in general. Note that although the flow matching rules are time-varying the corresponding actions do not change over time unless the network controller wants to modify the forwarding behavior (e.g., because of dynamic routing, load balancing, etc.)

The invention also allows using timeouts for deleting stale forwarding rules and thus, until such flows are purged, the new rule of the new epoch can coexist with the old rule. This allows a grace period where the source node that is out of sync with the network controller can still be sending flows with respect to the old flow rule. During the grace period, the packets of the source node are forwarded with no disruption as long as source node switches to the new flow template before the grace period ends. The situation where the old and the new flows coexist in the forwarding table is depicted by rules (101) and (102) in FIG. 6.

When many source-destination pairs consume the same header field for defining the dynamic flow templates, the field values can be quickly exhausted if the field is not large enough. The network controller must make sure that all the allowed fields should be used at each epoch by avoiding collisions among the sequences of flow rules being used. FIG. 7 shows how one field value is used by n source-destination pairs in time without wasting any field value. If it is not the network controller but the source-destination pairs that determine the sequence of field values to be used, then such an optimization might not be possible.

Although the figures are limited to a unicast session between a single source and a single destination node, the invention is applicable to multicast sessions from multiple to source nodes to multiple destination nodes. Each multicast session must be assigned a dynamic flow template and corresponding dynamic rules are installed by the network controller.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, to script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example to microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of methods for forwarding rule hopping based secure communications. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method as implemented in a sender host sending a packet flow to a receiving host via a software defined network (SDN), the method comprising the steps of:
   a. communicating with a controller in the SDN, using a control interface, and agreeing on a parametric function for altering one or more header fields in a header of a packet flow over time, wherein the controller also communicates the agreed upon parametric function with the receiver host of the packet flow, wherein the controller calculates new header fields using the agreed upon parametric function, alters forwarding rules and sends the forwarding rules to one or more forwarders in a route of the packet flow; and
   b. sending the packet flow along the route in the SDN by altering one or more fields in the header of the packet flow based on the agreed upon parametric function.

2. The method of claim 1, wherein one or more forwarders in the route in the SDN locally calculate new header fields using the parametric function, and alter forwarding rules without an intervention from the controller.

3. The method of claim 1, wherein the new rules are sent to the one or more forwarders a-priori before alteration of header fields.

4. The method of claim 1, wherein the new rules are sent to the one or more forwarders in real-time just before alteration of headers fields.

5. The method of claim 1, wherein the forwarding rules are installed and removed by the controller according to any of the following: using timers or using flow remove/install commands.

6. The method of claim 1, wherein forwarding rules are removed by forwarders without intervention from the controller based on a forwarding rule aging parameter.

7. The method of claim 1, wherein old forwarding rules co-exist with new forwarding rules in forwarders for a grace period for transitioning.

8. The method of claim 1, wherein when header fields are altered, the route remains the same as the route in (b).

9. The method of claim 1, wherein when header fields are altered, a different route is picked over the route in (b).

10. The method of claim 1, wherein the altered header fields are a shared secret between the controller, the sender host and the receiver host.

11. The method of claim 1, wherein the altered header fields are any of the following: a port number associated with the sender host, a port number associated with the receiver host, one or more VLAN tags, an IP address of the sender host, or an IP address of the receiver host.

12. The method of claim 1, wherein collision is prevented by ensuring no two distinct and active packet flows use similar header fields.

13. A method as implemented in a controller of a software defined network (SDN) comprising:
   a. communicating with a sender host and a receiver host in the SDN via a control interface and agreeing on a communications procedure for altering one or more header fields in a header of a packet flow over time, the sender host sending the packet flow by altering one or more fields in the header of the packet flow based on the agreed upon communications procedure; and
   b. calculating new header fields using the agreed upon communication procedure, altering forwarding rules and sending the forwarding rules to one or more forwarders in a route of the packet flow such that when the sender host transitions into communications involving the agreed upon communications procedure based on altered header fields, a corresponding altered forwarding rule matching new header fields with an associated action is installed in all forwarders along a route of the packet flow.

14. The method of claim 13, wherein forwarding rules are sent to the one or more forwarders a-priori before alteration of header fields.

15. The method of claim 13, wherein forwarding rules are sent to the one or more forwarders in real-time just before alteration of headers fields.

16. The method of claim 13, wherein forwarding rules are installed and removed by the controller according to any of the following: using timers or using flow remove/install commands.

17. The method of claim 13, wherein forwarding rules are removed by forwarders without intervention from the controller based on a forwarding rule aging parameter.

18. The method of claim 13, wherein old forwarding rules co-exist with new forwarding rules in forwarders for a grace period for transitioning.

19. The method of claim 13, wherein the altered header fields are a shared secret between the controller, the sender host and the receiver host.

20. The method of claim 13, wherein the altered header fields are any of the following: a port number associated with the sender host, a port number associated with the receiver host, one or more VLAN tags, an IP address of the sender host, or an IP address of the receiver host.

21. The method of claim 13, wherein collision is prevented by ensuring no two distinct and active packet flows use similar header fields.

22. A method as implemented in a sender host of a software defined network (SDN) comprising:

a. communicating with a controller in the SDN, using a control interface, and agreeing on a communications procedure for altering one or more header fields in a header of a packet flow over time, wherein the controller also communicates the agreed upon procedure with a receiver host of the packet flow;
b. sending the packet flow by altering one or more fields in the header of the packet flow based on the agreed upon communications procedure; and wherein the controller calculates new header fields using the agreed upon communications procedure, alters forwarding rules and sends the forwarding rules to one or more forwarders in a route of the packet flow such that when the sender host transitions into communications involving the agreed upon communications procedure based on altered header fields, a corresponding altered forwarding rule matching new header fields with an associated action is installed in all forwarders along a route of the packet flow.

* * * * *